Sept. 26, 1944.  M. D. ASBURY  2,359,076
SCOOTER BOB
Filed Aug. 27, 1943
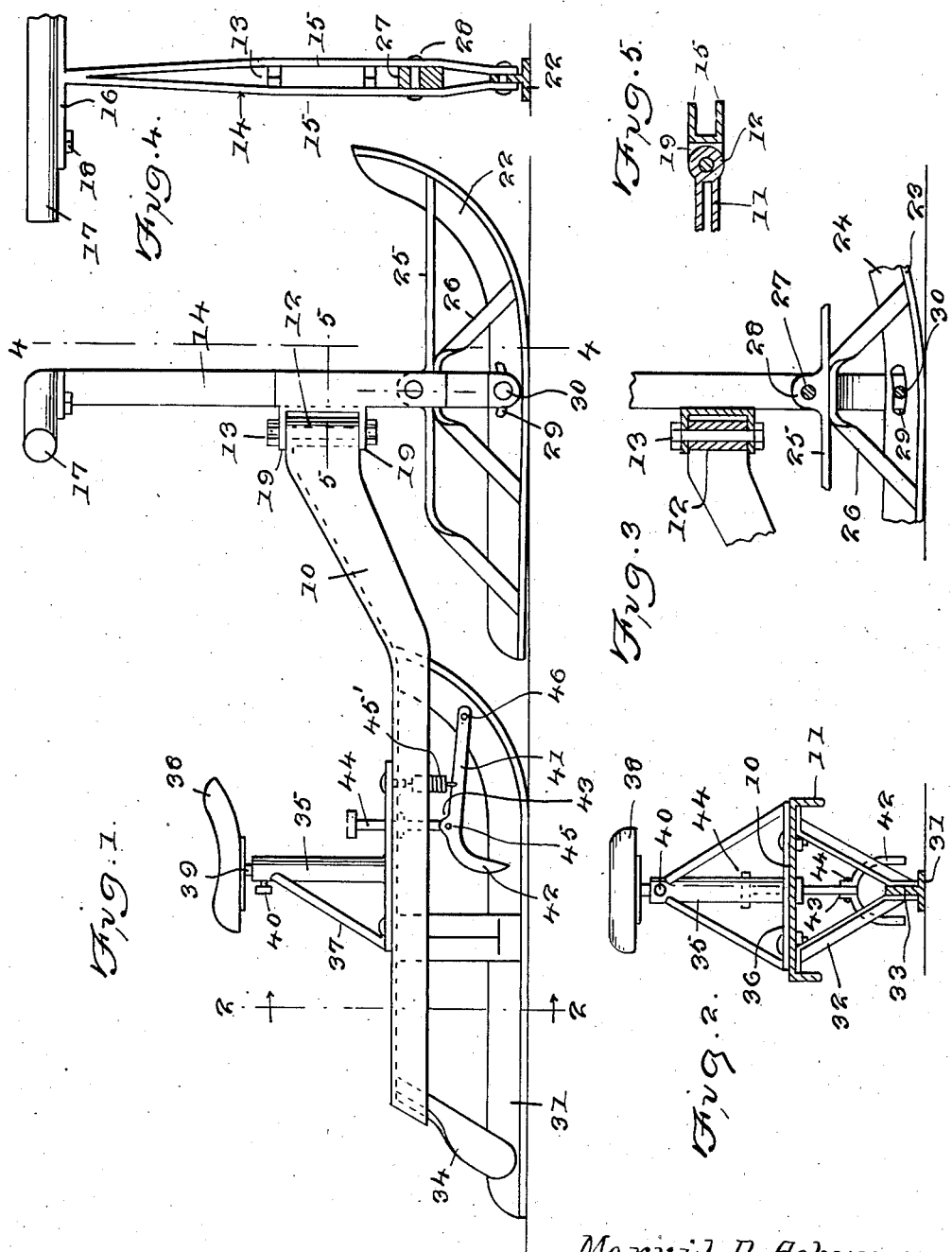
Mervil D. Asbury
INVENTOR
BY
Victor J. Evans & Co.
ATTORNEYS Patented Sept. 26, 1944

2,359,076

UNITED STATES PATENT OFFICE 2,359,076

SCOOTER BOB

Mervil D. Asbury, Hines, Oreg.

Application August 27, 1943, Serial No. 500,262

3 Claims. (Cl. 280—16)

This invention relates to a scooter bob and has for an object to provide a vehicle of this character which employs a dirigible front runner so as to be easily steered, the scooter having a seat to permit the occupant to sit down while coasting, the scooter also having a brake to control the speed of the vehicle on grades.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a side elevation of a scooter bob constructed in accordance with the invention.

Figure 2 is a vertical sectional view taken on the line 2—2 of Figure 1.

Figure 3 is a detail vertical sectional view showing the connection of the dirigible front runner with the platform of the vehicle.

Figure 4 is a vertical sectional view taken on the line 4—4 of Figure 1.

Figure 5 is a horizontal sectional view taken on the line 5—5 of Figure 1.

Referring now to the drawing in which like characters of reference designate similar parts in the various views, the scooter bob comprises a platform 10, preferably formed of sheet metal and having its edges turned downwardly to provide reinforcing flanges 11. At the front end of the platform the flanges converge and are formed with an integral tubular bearing 12 adapted to receive a king pin or pivot pin 13.

A steering post 14, formed of strap material, is provided with two side members 15, see Figure 4, which converge at the top and are formed integral with a horizontal bar 16 to which a handle bar 17 is secured by bolts 18. The post is provided with a pair of apertured ears 19 which align with the tubular bearing 12 and receive the ends of the pivot pin 13.

The forward runner 22 is substantially T-shape in cross section and is formed with a wide tread flange 23 and with a vertically disposed web 24. The front end of the runner is curved upwardly and the runner is reinforced and braced by a horizontal brace 25 which is secured at the forward end to the upturned end of the runner and is bent downwardly and secured at the rear end to the flange of the runner in any preferred manner. A second brace, inverted V-shape, as shown at 26, is engaged with the bottom of the brace 25 and the lower ends of its legs are secured to the web of the runner in any preferred manner. The upper brace is provided with a tubular bearing 27, see Figure 4, through which a pivot pin 28 is passed to pivotally secure the runner to the post, so that the runner may have some rocking movement. Also for the same purpose, an arcuate slot 29 is formed in the web of the runner, concentric with the pivot pin 28 and receives a guide pin 30 which is passed through the lower end of the post.

The rear runner 31 is a fixed runner and is similar in construction to the front dirigible runner. The upturned front end of the rear runner is secured in any preferred manner to the platform 10 and the runner is braced through the medium of a pair of oppositely disposed downwardly inclined braces 32, see Figure 2, which are secured at the upper ends to the bottom face of the platform and are secured at the lower ends to the web 33 of the fixed runner 31. A second brace 34 is secured at the upper end to the bottom face of the platform and inclines downwardly and rearwardly, the lower end of this brace is also secured to the web of the fixed runner.

A tube 35 is secured at the lower end to a base plate 36 which is secured in any preferred manner to the top face of the platform. The tube extends vertically upward and is braced by downwardly and rearwardly inclined braces 37 which are secured at the lower ends to the base plate 36 in any preferred manner. A saddle or seat 38 is provided with a seat post 39 which is removably held in the tube 35 by a set screw 40.

For controlling the speed of the vehicle, a brake bar 41 is provided with a downwardly curved branched and pointed rear end 42 and near the rear end is provided with hinge ears 43 through which, and the lower end of a vertically disposed brake pedal 44, a pivot pin 45 is engaged. A helical spring 45' is connected at one end to the brake bar 41 and is connected at the upper end to the bottom of the platform to hold the brake released. The front end of the brake bar is pivotally connected to the web 33 of the rear runner, by a pivot pin 46. The brake pedal is disposed adjacent to the seat 38, so that the operator may step on the brake pedal to rock the brake bar 41 on the pivot pin 46 and engage the branched rear end of the bar with the snow or ice on opposite sides of the tread of the rear runner.

From the above description it is thought that the construction and operation of the invention will be fully understood without further explanation.

I claim:

1. A scooter bob comprising a sheet metal platform having the edges turned downwardly to provide reinforcing flanges, the front ends of the flanges converging and being formed to provide a vertical tubular bearing, a steering post having a handle at the upper end and provided with perforated ears aligning with the tubular bearing, a pivot pin engaged through said ears and through the bearing, a forward runner of T-shape cross section curved upwardly at the forward end, braces extending upwardly from the runner toward the post and provided with a horizontal tubular bearing, a pivot pin engaged through the post and through the horizontal bearing to permit the runner having rocking movement, there being an arcuate slot in the runner concentric with the axis of the horizontal bearing, a pivot pin engaged through the lower end of the post and through the slot to permit rocking movement of the runner, a rear runner having an upwardly curved forward end secured to the platform, and braces secured to the platform and to the runner for rigidly securing the runner to the platform.

2. The structure as of claim 1 and in which there is added thereto a tube extending upwardly from the platform, and an operator's seat having a post removably secured in the upper end of the tube.

3. The structure as of claim 1 and in which there is added thereto a brake bar pivotally connected at the forward end to the bottom of the platform and having a branched rear end adapted to engage the ice or snow on opposite sides of the rear runner, a spring connected to the brake bar and to the platform normally holding the brake bar released, and a brake pedal mounted for vertical movement in the platform and pivotally connected at the lower end to the brake bar for moving the brake bar to operative position to control the speed of the scooter bob.

MERVIL D. ASBURY.